(12) United States Patent
Goo et al.

(10) Patent No.: US 8,493,343 B2
(45) Date of Patent: Jul. 23, 2013

(54) TOUCH PANEL AND NOISE REDUCING METHOD THEREFOR

(75) Inventors: Nam-Hee Goo, Gunsan-si (KR); Hee-Jin Choi, Seoul (KR); Hee-Bum Park, Seongnam-si (KR); Byoung-Jun Lee, Cheonan-si (KR); Jai-Hyun Koh, Anyang-si (KR); Bong-Hyun You, Yongin-si (KR)

(73) Assignee: Samsung Display Co., Ltd. (KR)

( * ) Notice: Subject to any disclaimer, the term of this patent is extended or adjusted under 35 U.S.C. 154(b) by 661 days.

(21) Appl. No.: 12/564,338

(22) Filed: Sep. 22, 2009

(65) Prior Publication Data

US 2010/0271319 A1 Oct. 28, 2010

(30) Foreign Application Priority Data

Apr. 22, 2009 (KR) .................. 10-2009-0035162

(51) Int. Cl.
*G06F 3/041* (2006.01)
(52) U.S. Cl.
USPC .................................................. 345/173
(58) Field of Classification Search
USPC ........................................... 345/173, 174
See application file for complete search history.

(56) References Cited

U.S. PATENT DOCUMENTS

| | | | | |
|---|---|---|---|---|
| 5,079,420 A | * | 1/1992 | Turnbull ............... | 250/338.3 |
| 7,032,187 B2 | | 4/2006 | Keely, Jr. et al. | |
| 7,737,957 B2 | * | 6/2010 | Lee et al. ............... | 345/173 |
| 7,868,875 B2 | * | 1/2011 | Park et al. ............... | 345/173 |
| 7,920,128 B2 | * | 4/2011 | Park et al. ............... | 345/173 |
| 7,952,567 B2 | * | 5/2011 | Aroyan et al. ........... | 345/174 |
| 2003/0231169 A1 | * | 12/2003 | Aroyan et al. ........... | 345/173 |
| 2008/0259048 A1 | * | 10/2008 | Touyamasaki ........... | 345/173 |
| 2010/0025123 A1 | * | 2/2010 | Lee et al. ............... | 178/18.03 |
| 2010/0045631 A1 | * | 2/2010 | Chen et al. ............... | 345/174 |
| 2010/0073567 A1 | * | 3/2010 | Lee et al. ............... | 348/569 |
| 2010/0090968 A1 | * | 4/2010 | Lee et al. ............... | 345/173 |
| 2010/0302189 A1 | * | 12/2010 | Liu ....................... | 345/173 |
| 2011/0199312 A1 | * | 8/2011 | Okuta ..................... | 345/173 |

FOREIGN PATENT DOCUMENTS

| | | |
|---|---|---|
| JP | 09044304 | 2/1997 |
| JP | 2002082766 | 3/2002 |
| JP | 2004199181 | 7/2004 |
| JP | 2006039686 | 2/2006 |
| KR | 1020040042147 | 5/2004 |
| KR | 1020040057755 | 7/2004 |
| KR | 1020040061897 | 7/2004 |
| KR | 1020040103125 | 12/2004 |
| KR | 1020040103126 | 12/2004 |

* cited by examiner

*Primary Examiner* — Fred Tzeng
(74) *Attorney, Agent, or Firm* — Cantor Colburn LLP

(57) ABSTRACT

A method for reducing noise of a touch panel includes: generating a detection signal including at least one contact region; generating a combination noise region including at least a portion of the at least one contact region; and generating a final detection signal. The generating the final detection signal includes removing the combination noise region from the detection signal.

16 Claims, 7 Drawing Sheets

TOUCH PANEL AND NOISE REDUCING METHOD THEREFOR

This application claims priority to Korean Patent Application No. 10-2009-0035162, filed on Apr. 22, 2009, and all the benefits accruing therefrom under 35 U.S.C. §119, the content of which in its entirety is herein incorporated by reference.

BACKGROUND OF THE INVENTION (a) Field of the Invention

The present invention relates to a touch panel and a noise eliminating method for using the touch panel and, more particularly, the present invention relates to a method for removing noise from the touch panel.

(b) Description of the Related Art

Various input devices are currently used to execute functions in devices such as a liquid crystal display, an organic light emitting device, a portable transmitting device or other information processing devices. Recently, for example, an input device provided with a touch panel has been increasingly used.

More specifically, the touch panel is typically a device for allowing a machine, e.g., a computer, to perform a desired command by writing a character, drawing a picture, or selecting an icon by contacting a screen of the touch panel with a finger, a touch pen or a stylus, for example. Accordingly, a display device to which the touch panel is attached determines whether a user's finger (or touch pen or stylus, for example) touches a screen, as well as specific touch position information for a touch point thereof.

When a contact member such as the user's finger or touch pen, for example, contacts the screen of the touch panel, inadvertent additional contact is often made on the screen due to another portion of the user's hand touching the screen, which generates an additional touch point. Specifically, for example, an edge portion of the user's palm often touches the screen. As a result, an irregular noise, e.g., palm noise, is generated. To remove the palm noise, sensitivity of the touch panel may be decreased. However, decreasing the sensitivity adversely affects performance of the touch panel, and is generally not desirable, since touch panels typically require maximized sensitivity to operate efficiently. Accordingly, there is a need for a method of effectively removing an irregular noise from the touch panel, such as noise from a hand of a user, without decreasing sensitivity of the touch panel.

BRIEF SUMMARY OF THE INVENTION

Exemplary embodiments of the present invention provide a method of effectively eliminating and/or substantially reducing irregular noise, e.g., noise generated by portions of a user's a hand which inadvertently contacts a touch panel, from the touch panel without decreasing sensitivity of the touch panel. Exemplary embodiments also provide a touch panel for using the method.

A method for reducing noise in a touch panel according to an exemplary embodiment of the present invention includes: generating a detection signal including at least one contact region; generating a combination noise region including at least a portion of the at least one contact region; and generating a final detection signal. The generating the final detection signal includes removing the combination noise region from the detection signal.

When the detection signal includes two or more contact regions, the generating the combination noise region may further include calculating a first interval between adjacent contact regions of the two or more contact regions, comparing the first interval and an effective-noise distance, and generating the combination noise region by combining the adjacent contact regions when the first interval is less than the effective-noise distance.

The generating the final detection signal may further include determining whether a width of the combination noise region and a width of a remaining contact region not included in the combination noise region are within an effective width range, and removing the combination noise region or the remaining contact region not included in the combination noise region which is not within the effective width range.

When the width of the combination noise region and the width of the remaining contact region not included in the combination noise region are both within the effective width range, the generating the final detection signal may further include determining a position of an effective contact region of the final detection signal of a previous frame or a next frame, and removing the combination noise region or the remaining contact region not included in the combination noise region which is further from the effective contact region of the final detection signal of the previous or next frame.

The detection signal may include an X direction detection signal or a Y direction detection signal, and the X direction may be different from, e.g., substantially perpendicular to, the Y direction.

The detection signal and the final detection signal may include a same effective contact region.

A touch panel according to an exemplary embodiment of the present invention includes a touch display panel including: sensing units; transverse sensing data lines and longitudinal sensing data lines, the transverse sensing data lines and the longitudinal sensing data lines being connected to the sensing units; and a sensing signal processor connected to the transverse sensing data lines and the longitudinal sensing data lines and including a noise removing unit. The sensing signal processor generates a detection signal including at least one contact region based on a sensing data signal from the transverse sensing data lines and the longitudinal sensing data lines, and the noise removing unit generates a combination noise region including at least a portion of the at least one contact region, and generates a final detection signal by removing the combination noise region from the detection signal.

When the detection signal includes two or more contact regions, the noise removing unit may calculate a first interval between adjacent contact regions of the two or more contact regions, and may compare the first interval and an effective-noise distance, and may generate the combination noise region by combining the adjacent contact regions when the first interval is less than the effective-noise distance.

The noise removing unit may determine whether a width of the combination noise region and a width of a remaining contact region not included in the combination noise region are within an effective width range, and remove the combination noise region or the remaining contact region not included in the combination noise region which is not within the effective width range to generate the final detection signal.

When the width of the combination noise region and the width of the remaining contact region not included in the combination noise region are both within the effective width range, the noise removing unit may remove the combination noise region or the remaining contact region not included in the combination noise region which is further from an effective contact region of the final detection signal of a previous frame or a next frame.

The detection signal may include X direction detection signal or a Y direction detection signal, and the X direction may be different from, e.g., substantially perpendicular to, the Y direction.

The detection signal and the final detection signal may include a same effective contact region.

BRIEF DESCRIPTION OF THE DRAWINGS

The above and other aspects, advantages and features of the present invention will become more apparent by describing in further detail exemplary embodiments thereof with reference to the accompanying drawings, in which.

DETAILED DESCRIPTION OF THE INVENTION

Figure 1:
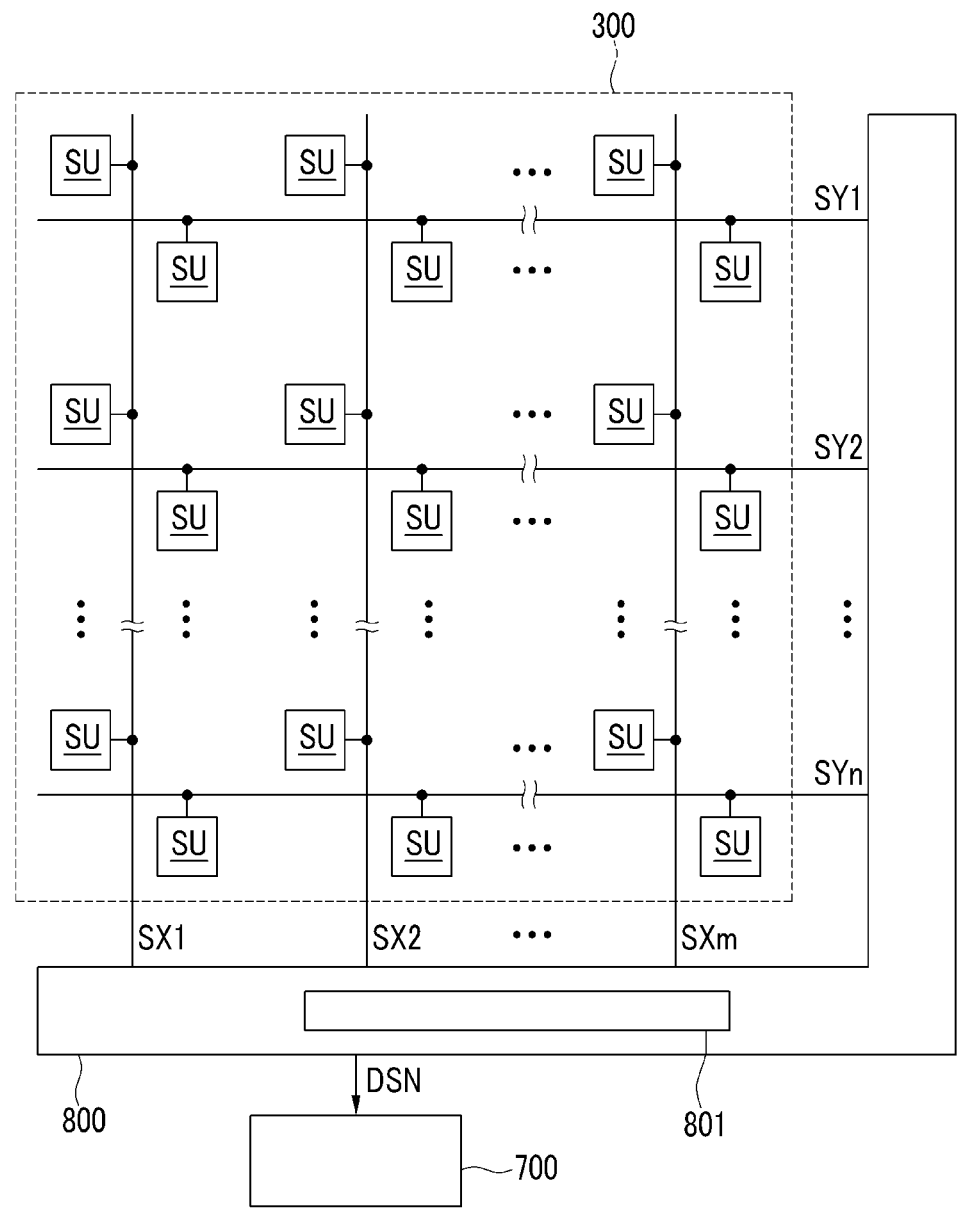
FIG. 1 is a block diagram of an exemplary embodiment of a touch panel according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A touch panel according to an exemplary embodiment of the present invention will now be described in further detail with reference to FIG. 1.

FIG. 1 is a block diagram of an exemplary embodiment of a touch panel according to the present invention.

Referring to FIG. 1, a touch panel according to an exemplary embodiment of the present invention includes a touch display panel 300, a sensing signal processor 800 and a micro-controller 700 connected to the sensing signal processor 800.

The touch display panel 300 includes detection signal lines SY1-SYn and SX1-SXm, and sensing units SU connected thereto. The sensing units SU are arranged in substantially matrix pattern in the touch panel display 300, as shown in FIG. 1.

The detection signal lines SY1-SYn and SX1-SXm include transverse sensing data lines SY1-SYn and longitudinal sensing data lines SX1-SXm (hereinafter collectively referred to as "detection signal lines"), both of which transmit sensing data signals. The transverse sensing data lines SY1-SYn extend along a first direction, e.g., a row direction (as viewed in FIG. 1), and are disposed substantially in parallel with each other, while the longitudinal sensing data lines SX1-SXm extend along a second direction, e.g., a substantially column direction substantially perpendicular to the first direction, and are disposed substantially parallel to each other, as shown in FIG. 1. The detection signal lines may further include reference voltage lines (not shown) which transmit a reference voltage based on a type of touch display panel 300 implemented in a given exemplary embodiment.

The sensing units SU generate sensing data signals based on contact that is made with the touch panel, as will be described in further detail below. Each sensing unit SU of the sensing units SU is connected to a corresponding transverse sensing data line SY1-SYn or, alternatively, to a corresponding longitudinal sensing data line SX1-SXm. In an exemplary embodiment, a density of a pair of sensing units SU disposed proximate to a region where the transverse sensing data lines SY1-SYn and the longitudinal sensing data lines SX1-SXm intersect may be substantially the same as (or, in an alternative exemplary embodiment, different from) a resolution of the touch panel.

The sensing signal processor 800 is connected to the sensing data lines SY1-SYn and SX1-SXm of the touch display panel 300, receives the sensing data signals, which are analog signals, outputted via the sensing data lines SY1-SYn and SX1-SXm for signal-processing such as filtering, for example, and an analog-to-digital converts them to generate digital detection signals DSN.

In an exemplary embodiment, the sensing signal processor 800 includes a noise removing unit 801. The noise removing unit 801 removes noise, e.g., signals that are not effective contact information from a user's finger or a touch pen of the user, for example, from the sensing data signals before converting the sensing data signals into the digital detection signals DSN. A method of reducing and/or removing the noise using the noise removing unit 801 will be described in further detail below.

The micro-controller 700 receives the digital detection signals DSN from the sensing signal processor 800, processes the digital detection signals DSN to change a signal standard thereof, for example, and outputs the processed signals to an external device (not shown).

A contact determining unit (not shown), which receives the digital detection signals DSN from the sensing signal processor 800 and performs a calculating process to determine contact existence, e.g., contact time, and contact position, and generates contact information, may be further included between the sensing signal processor 800 and the micro-controller 700.

A sensing operation of the touch panel and a noise reducing method according to an exemplary embodiment of the present invention will now be described in further detail with reference to FIGS. 2-4.

Figure 2:
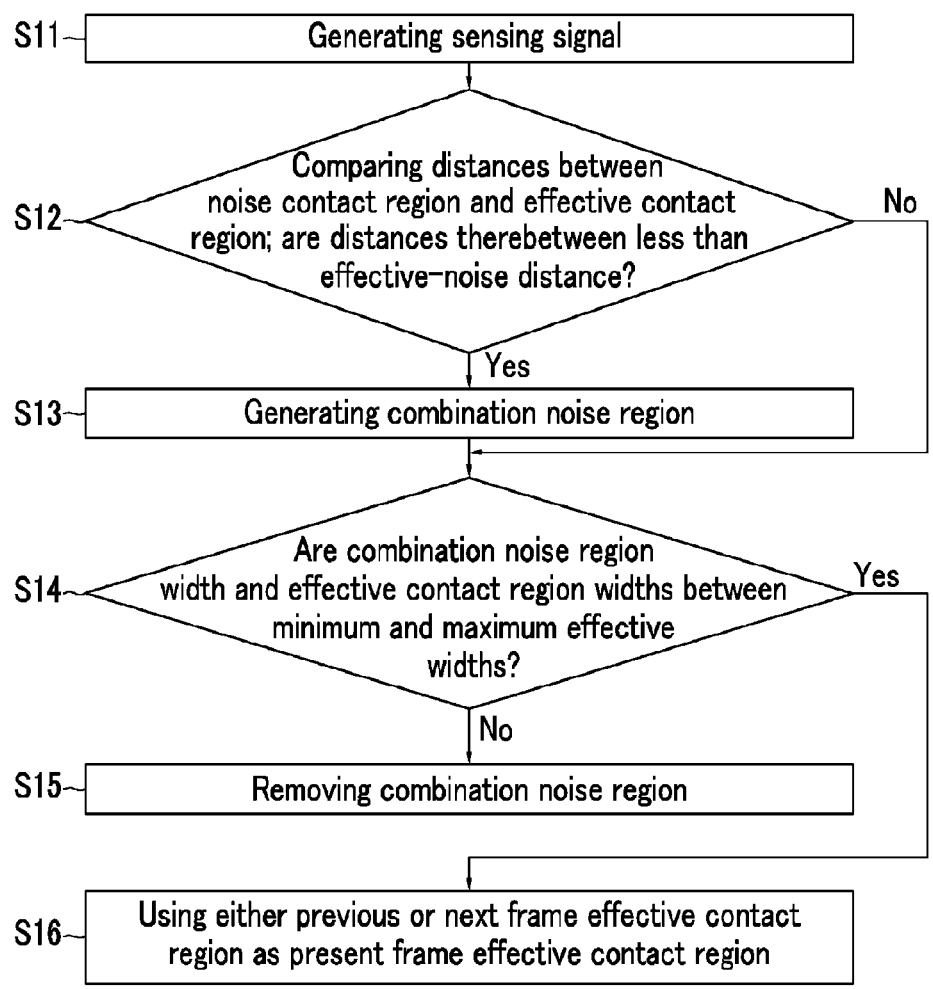
FIG. 2 is a flowchart illustrating an exemplary embodiment of a method of eliminating noise from a touch panel according to the present invention.
Figure 3:
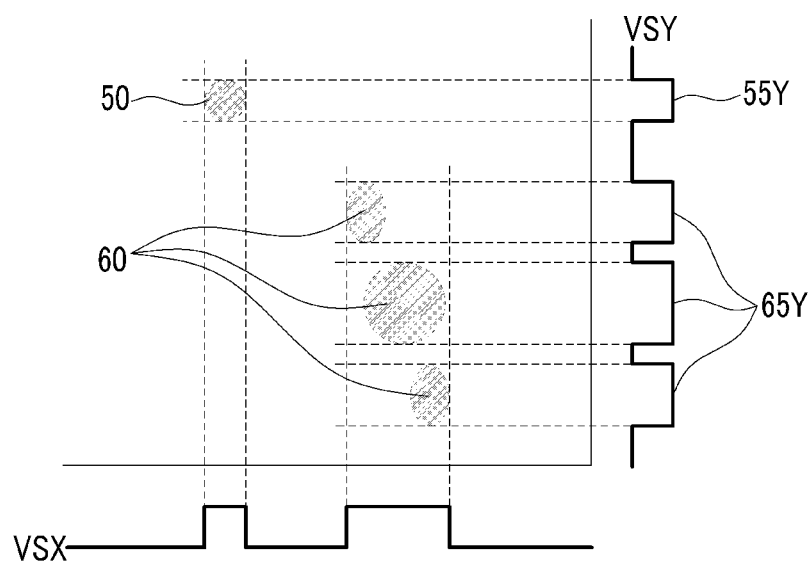
FIG. 3 is a plan view of an exemplary embodiment of a touch panel illustrating a contact type a detection signal thereof according to present invention.
Figure 4:
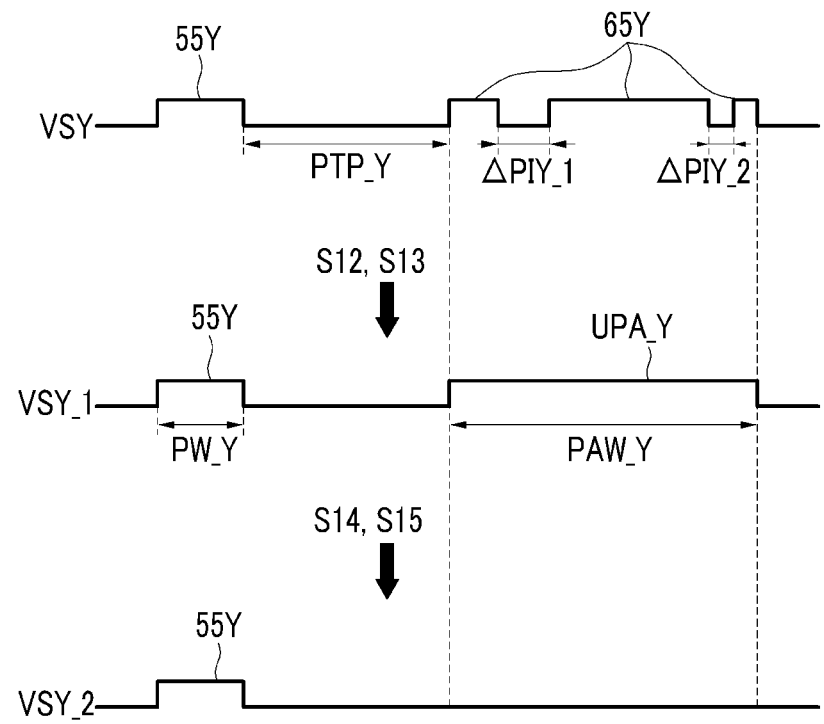
FIG. 4 is a signal timing diagram illustrating an exemplary embodiment of a method of removing noise from the detection signal shown in FIG. 3.

FIG. 2 is a flowchart illustrating an exemplary embodiment of a method of eliminating noise from a touch panel according to the present invention, FIG. 3 is a plan view of an exemplary embodiment of a touch panel illustrating a contact type a detection signal thereof according to present invention, and FIG. 4 is a signal timing diagram illustrating an exemplary embodiment of a method of removing noise from the detection signal shown in FIG. 3. More particularly, FIG. 3 shows one example of a contact type of touch panel and a detection signal thereof, and FIG. 4 is a view showing removal of noise of a detection signal of a Y direction from the detection signal shown in FIG. 3.

When contact is made by a contact member, such as a user's finger or a touch pen, for example, on the touch display panel 300, as shown in FIG. 3, an effective contact portion 50 and a noise contact portion 60 are generated. More specifically, the effective contact portion 50 is a desired effective touch portion of the user, e.g., is a portion that is contacted by the contact member (such as the finger or the touch pen), while the noise contact portion 60 is the contact portion except for the effective contact portion 50, which may be generated through additional, inadvertent contact by the hand, for example, on the touch display panel 300. The noise contact portion 60 has an irregular and non-uniform shape, as shown in FIG. 3.

Thus, the sensing data signals are generated by the sensing units SU of both the effective contact portion 50 and the noise contact portion 60 for each frame or, alternatively, for a plurality of frames, and the sensing signal processor 800 reads the sensing data signals generated through the sensing data lines SY1-SYn and SX1-SXm. In an exemplary embodiment, one frame may be a period in which an image is displayed to the touch display panel 300.

As shown in FIG. 3, an X direction detection signal VSX, e.g., a longitudinal direction detection signal VSX, and a Y direction detection signal VSY, e.g., a transverse direction detection signal VSY, are generated from the sensing data signals transmitted through the longitudinal sensing data lines SX1-SXm and the transverse sensing data lines SY1-SYn, respectively, and are outputted to the noise removing unit 801 (step S11 of FIG. 2).

Hereinafter, for purposes of description, exemplary embodiments of the present invention will be described with reference to the Y direction detection signal VSY. However, it will be noted that the following description may be applied to the X direction detection signal VSX in substantially the same manner, and has been omitted strictly for purposes of avoiding repetitive detailed description.

In an exemplary embodiment, the Y direction detection signal VSY includes at least one effective contact region 55Y and at least one noise contact region 65Y representing a relatively high voltage as compared to a voltage level of the least one effective contact region 55Y, for example. The effective contact region 55Y corresponds to the effective contact portion 50 of the touch display panel 300, and the noise contact region 65Y corresponds to the noise contact portion 60 of the touch display panel 300.

Referring now to FIG. 4, the noise contact region 65Y is irregularly distributed, e.g., is disposed in a relatively arbitrary region (as compared to the effective contact region 55Y), and when a plurality of noise contact regions 65Y exist, distances $\Delta PIY\_1$ and $\Delta PIY\_2$, e.g., distances between noise contact regions 65Y of the plurality of noise contact regions 65Y, are generally less than a distance PTP_Y between the effective contact region 55Y and plurality of noise contact regions 65Y, as shown in FIG. 4.

Based on the abovementioned difference in distances, the noise removing unit 801 compares the distance PTP_Y between the effective contact region 55Y and the adjacent, e.g., neighboring, noise contact region 65Y, and the distances ΔPIY_1, ΔPIY_2, ..., ΔPIY_n between the adjacent, e.g., neighboring, noise contact regions 65Y of the plurality of noise contact regions 65Y with a predetermined effective-noise distance SPD_Y (step S12 of FIG. 2) to generate an intermediate detection signal VSY_1 including a combination noise region UPA_Y (S13 of FIG. 2). More particularly, as shown in FIG. 4, when intervals between adjacent, e.g., neighboring, noise contact regions 65Y is less than the effective-noise distance SPD_Y in the detection signal VSY, the adjacent noise contact regions 65Y are connected to each other to generate the combination noise region UPA_Y having wider width than individual widths of each of the adjacent noise contact regions 65Y.

In an exemplary embodiment, the effective-noise distance SPD_Y may be a minimum value of the distance between the effective contact region 55Y and the plurality of noise contact regions 65Y. More specifically, for example, in an exemplary embodiment of an image display unit in the touch display panel 300 includes, the effective-noise distance SPD_Y may be a distance of forty pixels, but alternative exemplary embodiments are not limited thereto.

In addition, in an exemplary embodiment, the distance between the effective contact region 55Y and the plurality of noise contact regions 65Y is larger than the predetermined effective-noise distance SPD_Y. Accordingly, the combination noise region UPA_Y and the effective contact region 55Y are separated from each other.

In contrast, when only one noise contact region 65Y exists, step S12 (FIG. 2), in which predetermined effective-noise distance SPD_Y is compared to the distances between the effective contact region 55Y and the noise contact region 65Y, as well step S13, in which the combination noise region UPA_Y is generated, may be omitted. In this case, the one noise contact region 65Y is the combination noise region UPA_Y.

Referring still to FIG. 3 and FIG. 4, the combination noise region UPA_Y in an exemplary embodiment is larger than the effective contact region 55Y. Accordingly, it is determined whether a width PAW_Y of the combination noise region UPA_Y and a width PW_Y of the effective contact region 55Y are between a minimum effective width SPW_Y_min and a maximum effective width SPW_Y_max, which are previously determined for the noise removing unit 801 (step S14 of FIG. 2). In an exemplary embodiment, the minimum effective width SPW_Y_min and the maximum effective width SPW_Y_max may be determined as a minimum value and a maximum value of a width of the effective contact region 55Y, but alternative exemplary embodiments are not limited thereto.

Accordingly, the width PAW_Y of the combination noise region UPA_Y does not exist between the minimum effective width SPW_Y_min and the maximum effective width SPW_Y_max, e.g., the combination noise region UPA_Y is removed, and the width PW_Y of the effective contact region 55Y is maintained between the minimum effective width SPW_Y_min and the maximum effective width SPW_Y_max (step S15). As a result, a final detection signal VSY_2 is generated. In an exemplary embodiment, the final detection signal VSY_2 is generated by removing the combination noise region UPA_Y from the Y-direction detection signal VSY. Accordingly, in an exemplary embodiment, noise caused by inadvertent and/or extraneous contact of the user's hand or touch pen, for example, is effectively removed from the Y direction detection signal VSY.

In an alternative exemplary embodiment, the combination noise region UPA_Y may not exist. In this case, only the effective contact region 55Y remains. In contrast, the effective contact region 55Y may not exist and only the combination noise region UPA_Y may exist. In this case, if the width PAW_Y of the combination noise region UPA_Y is not interposed between the minimum effective width SPWY_min and the maximum effective width SPWY_max, a final detection signal VSY2 is not generated.

Accordingly, the final detection signal VSY_2, from which the combination noise region UPA_Y is removed, is converted into the digital detection signal DSN in the sensing signal processor 800, and is outputted to the micro-controller 700.

In the foregoing description, the noise contact region 65Y and/or the combination noise region UPA_Y, as well as the effective contact region 55Y, were described for purposes of convenience, but it will be noted that, in an exemplary embodiment of the present invention, the noise eliminating method may be applied in a state in which the noise contact region 65Y and/or the combination noise region UPA_Y, as well as the effective contact region 55Y, are not differentiated from each other.

However, the width PAW_Y of the combination noise region UPA_Y and the width PW_Y of the effective contact region 55Y may be similar to each other, such that the noise region UPA_Y cannot be removed as described above. In this case, a noise eliminating method according to an exemplary embodiment, as will now be described in further detail with reference to FIGS. 5 and 6, as well as FIGS. 1 and 2, is provided. The same or like components as in the exemplary embodiments described above are indicated by the same reference characters, and any repetitive detailed description thereof will hereinafter by omitted.

Figure 5:
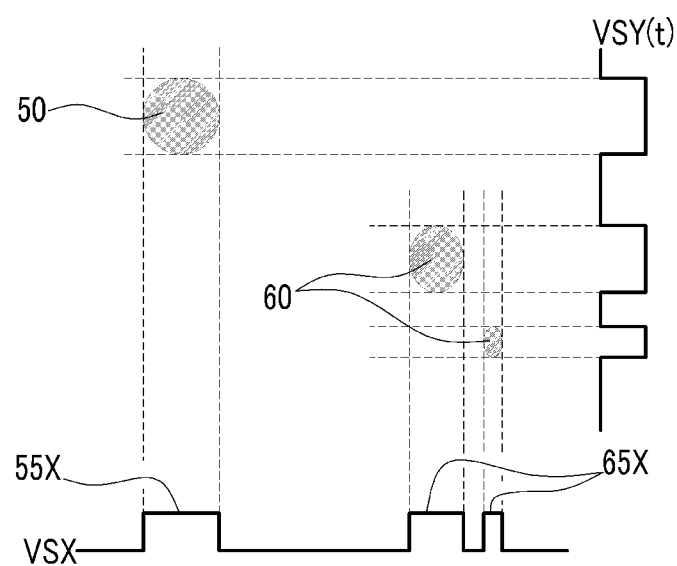
FIG. 5 is a plan view of an alternative exemplary embodiment a touch panel illustrating a contact type and a detection signal thereof according to the present invention.
Figure 6:
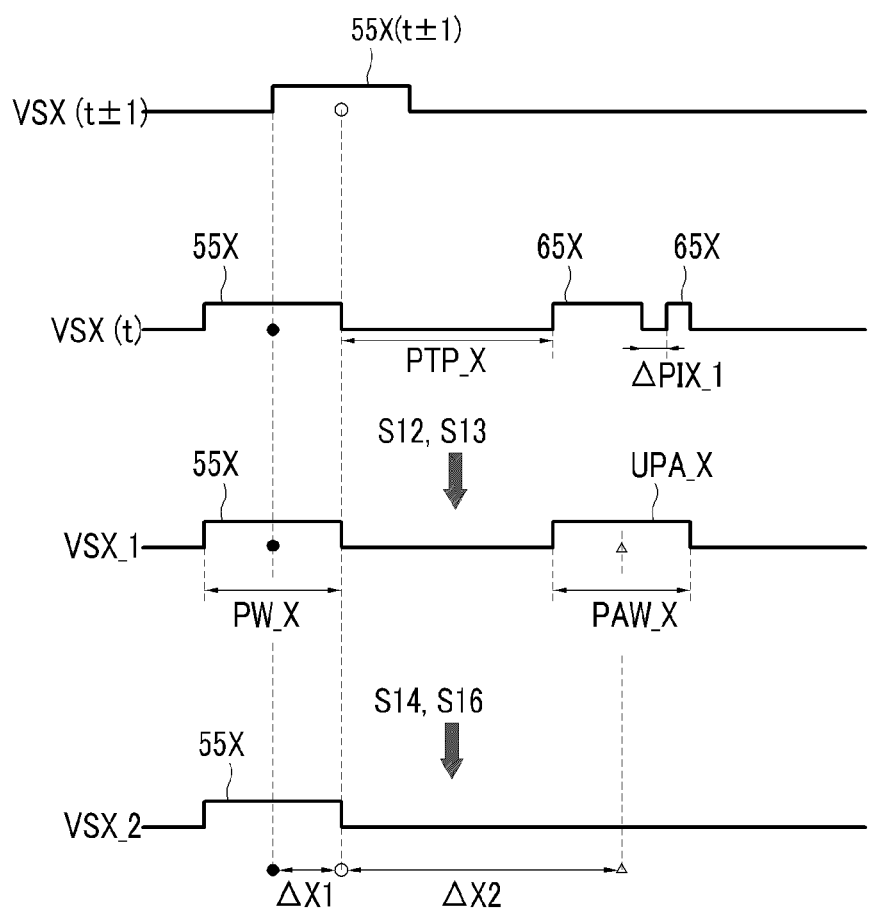
FIG. 6 is a signal timing diagram illustrating an alternative exemplary embodiment of a method of removing noise in the detection signal shown in FIG. 5.

FIG. 5 is a plan view of an alternative exemplary embodiment a touch panel illustrating a contact type and a detection signal thereof according to the present invention, and FIG. 6 is a signal timing diagram illustrating an alternative exemplary embodiment of a method of removing noise in the detection signal shown in FIG. 5. More particularly, FIG. 5 is another example of a contact type of touch panel and a detection signal thereof, and FIG. 6 is a view showing removal of noise in a detection signal of an X direction from the detection signal shown in FIG. 5.

When the contact by the contact member such as the user's finger or touch pen, for example, is applied to the touch display panel 300, as shown in FIG. 5, an effective contact portion 50 and a noise contact portion 60 are generated.

Thus, the sensing data signals are generated by the sensing units SU of the effective contact portion 50 and the noise contact portion 60 for each frame or, alternatively, for a plurality of frames, and the sensing signal processor 800 reads the sensing data signals generated through the sensing data lines SY1-SYn and SX1-SXm. In an exemplary embodiment, a present frame, in which the sensing data signal is generated is indicated by a "t," while a pervious frame, in which a previous sensing data signal is generated, is indicated by "t−1," and a next frame, in which a next sensing data signal is generated, is indicated by "t+1."

An X direction detection signal VSX(t) and a Y direction detection signal VSY(t) are generated from the sensing data signals respectively transmitted through the longitudinal sensing data lines SX1-SXm and the transverse sensing data lines SY1-SYn, respectively, and are outputted to the noise removing unit 801.

Hereinafter, an exemplary embodiment of the present invention will be described in further detail with respect to the X direction detection signal VSX(t). It will be noted, however, that the following description equally applies to the Y direction detection signal VSY(t).

In an exemplary embodiment, the X direction detection signal VSX(t) includes at least one effective contact region, e.g., an effective contact region 55X, and at least one noise contact region 65X, representing a relatively high voltage, as described in greater detail above.

Referring now to FIG. 6, the noise contact region 65X is irregularly distributed in an arbitrary region, and when a plurality of noise contact regions 65X exists, distances ΔPIX_1, ..., ΔPIX_n between the noise contact regions 65X and are generally less than the distance PTP_X between the effective contact region 55X and the plurality of noise contact region 65X.

Accordingly, the noise removing unit 801 compares the distance PTP_X between a neighboring effective contact region 55X and noise contact region 65X, and the distances ΔPIX_1, ..., ΔPIX_n between the neighboring noise contact regions 65X with a predetermined effective-noise distance SPD_X (step S12 of FIG. 2) to generate an intermediate detection signal VSX_1 including a combination noise region UPA_X (step S13 of FIG. 2). Thus, as shown in FIG. 6, the noise contact regions 65X in which the interval between the neighboring noise contact regions 65X is less than the effective-noise distance SPD_X in the detection signal VSX(t) are connected to each other, thereby generating the combination noise region UPA_X having the wider width Accordingly, the intermediate detection signal VSX_1 is generated.

In an exemplary embodiment, the effective-noise distance SPD_X may be a minimum value of the distance between the effective contact region 55X and the noise contact region 65X.

Additionally, the distance between the effective contact region 55X and the plurality of noise contact regions 65X may be larger than the predetermined effective-noise distance SPD_X, and the combination noise region UPA_X and the effective contact region 55X are thereby separated from each other.

In contrast, when only one noise contact region 65X exists, step S12, e.g., the comparing of the predetermined effective-noise distance SPD_X and the distance between the effective contact region 55X and the noise contact region 65X, as well as step S13, e.g., the generating of the combination noise region UPA_X, may be omitted. In this case, the one noise contact region 65X is determined as the combination noise region UPA_X.

Referring again to FIG. 6, in an exemplary embodiment, there may not be a large difference between the widths of the combination noise region UPA_X and the effective contact region 55X. Accordingly, in an exemplary embodiment, it is determined whether the width PAW_X of the combination noise region UPA_X and the width PW_X of the effective contact region 55X is between the minimum effective width SPW_X_min and the maximum effective width SPW_X_max (step S14 of FIG. 2). Accordingly, the noise is removed through a different method (than as described above with reference to alternative exemplary embodiments) when the width PAW_X of the combination noise region UPA_X and the width PW_X of the effective contact region 55X is interposed within the range. More particularly, as shown in FIG. 6, the distance difference ΔX1 between the position of the effective contact regions 55X(t±1) determined at the previous frame t−1 or, alternatively, at the next frame t+1, as well as and the position of the effective contact region 55X of the present frame t, along with the position difference ΔX2 between the position of the effective contact regions 55X(t±1) and the position of the combination noise region UPA_X of the present frame t are compared. Thereafter, the region that is closer to the position of the effective contact regions 55X (t±1) determined at the previous frame t−1 or, alternatively, the next frame t+1 is determined as the effective contact region 55X of the present frame t, and the remaining combination noise region UPA_X is removed (step S16 of FIG. 2).

In an exemplary embodiment, the position of the combination noise region UPA_X, the position of the effective contact region 55X (t±1) and the position of the effective contact region 55X may be determined based on a central position of each of the aforementioned regions, as shown in FIG. 6.

Accordingly, in an exemplary embodiment, the final detection signal VSX_2, from which the noise is removed, is generated, and the noise by extraneous and/or inadvertent contact, such as from the hand of the user, is effectively removed from the X direction detection signal VSX.

In the exemplary embodiments described above, the noise contact region 65X and/or the combination noise region UPA_X, as well as the effective contact region 55X, were described as differentiable from each other, but it will be noted that in an exemplary embodiment of the present invention, the noise eliminating method implemented in a state in which the noise contact region 65X and/or the combination noise region UPA_X, as well as the effective contact region 55X, may not be differentiable from each other.

Figure 7:
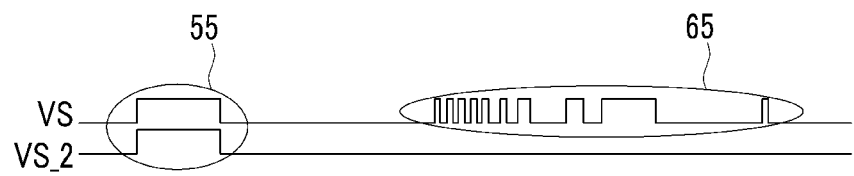
FIG. 7 is a signal timing diagram of a detection signal from which noise has been removed using an exemplary embodiment of a method of eliminating noise from a touch panel according to the present invention.

FIG. 7 is a is a signal timing diagram of a detection signal from which noise has been removed using an alternative exemplary embodiment of a method of eliminating noise in a touch panel according to the present invention.

Referring to FIG. 7, a noise contact region 65 is effectively removed from detection signals VS of the X direction and/or the Y direction by the noise eliminating method according to the exemplary embodiments of the present invention described herein, such that a final detection signal VS_2, in which only the effective contact region 55, remains is generated.

A touch panel is described above with reference to the exemplary embodiments thereof, but it will be noted that alternative exemplary embodiments of the present invention may be applied to various display devices, such as to a liquid crystal display or an organic light emitting device including the touch panel, for example. Moreover, in another alternative exemplary embodiment of the present invention, the touch panel may be a particular type of touch panel from various types such as a resistive type, a capacitive type and an electromagnetic ("EM") type, but alternative exemplary embodiments are not limited thereto.

Thus, according to exemplary embodiments of the present invention as described herein, the interval between a plurality of contact regions of a detection signal and a predetermined effective-noise distance are compared to generate a combination noise region, and it is determined whether the width of the combination noise region is included within a predetermined effective width range, and when the width of the combination noise region is not within the effective width region of, the combination noise region is removed, while when the width of the combination noise region is included in the effective width range, the position of the combination noise region is compared with the position of previous effective contact region to remove the combination noise region, such that a noise may be effectively removed from the detection signal of the touch panel without decreasing the sensitivity of the touch panel.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described in connection with exemplary embodiments thereof, it will be understood by those of ordinary skill in the art that the present invention is not limited thereto, but, on the contrary, that various changes in form and details may be made therein without departing from the spirit or scope of the present invention as defined by the following claims.

What is claimed is:

1. A method for reducing noise of a touch panel, the method comprising:
    generating a detection signal having at least two pulses corresponding to at least one contact portion of the touch panel;
    unifying adjacent pulses of the at least two pulses to constitute a wider pulse than each pulse of the adjacent pulses before the unification when an interval between the adjacent pulses is less than an effective-noise distance; and
    generating a final detection signal by removing the unified pulses from the detection signal.

2. The method of claim 1, wherein
    the generating the final detection signal includes:
    determining whether a width of the wider pulse and a width of a remaining pulse not included in the wider pulse are within an effective width range; and
    removing the wider pulse or the remaining pulse when the wider pulse or the remaining pulse is not within the effective width range.

3. The method of claim 2, wherein,
    when the width of the wider pulse and the width of the remaining pulse both are within the effective width range,
    the generating of the final detection signal includes:
    determining a position of a pulse corresponding to an effective contact portion in the final detection signal of a previous frame or a next frame; and
    removing on of the wider pulse and the remaining pulse that is further from the position of the pulse corresponding to the effective contact portion of the previous frame or the next frame.

4. The method of claim 1, wherein
    the detection signal includes an X direction detection signal or a Y direction detection signal, and
    the X direction is substantially perpendicular to the Y direction.

5. The method of claim 1, wherein
    the generating the final detection signal includes:
    determining whether a width of the wider pulse and a width of a remaining pulse not included in wider pulse is within an effective width range; and
    removing the wider pulse or the remaining pulse when the wider pulse or the remaining pulse is not within the effective width range.

6. The method of claim 5, wherein,
    when the width of the wider pulse and the width of the remaining pulse both are within the effective width range,
    the generating of the final detection signal includes:
    determining a position of a pulse corresponding to an effective contact portion in the final detection signal of a previous frame or a next frame; and
    removing one of the wider pulse and the remaining pulse that is further from the position of the pulse corresponding to the effective contact portion of the previous frame or the next frame.

7. The method of claim 1, wherein
    the detection signal includes an X direction detection signal or a Y direction detection signal, and
    the X direction is substantially perpendicular to the Y direction.

8. The method of claim 1, wherein the detection signal and the final detection signal include a same remaining pulse.

9. A touch panel comprising:
    a touch display panel including sensing units;
    transverse sensing data lines and longitudinal sensing data lines, the transverse sensing data lines and the longitudinal sensing data lines connected to the sensing units; and
    a sensing signal processor connected to the transverse sensing data lines and the longitudinal sensing data lines and including a noise removing unit, wherein
    the sensing signal processor generates a detection signal having at least two pulses corresponding to at least one contact portion of the touch display panel based on at least one of a sensing data signal from the transverse sensing data lines and a sensing data signal from the longitudinal sensing data lines, and
    the noise removing unit unifies adjacent pulses of the at least two pulses to constitute a wider pulse than each pulse of the adjacent pulses before the unification when an interval between the adjacent pulses is less than an effective-noise distance and generates a final detection signal by removing the unified pulses from the detection signal.

10. The touch panel of claim 9, wherein
    the noise removing unit generates the final detection signal by determining whether a width of the wider pulse and a width of a remaining pulse not included in the wider pulse are within an effective width range, and removing the wider pulse or the remaining pulse when the wider pulse or the remaining pulse is not within the effective width range.

11. The touch panel of claim 10, wherein,
    when the width of the wider pulse and the width of the remaining pulse both are within the effective width range, the noise removing unit removes one of the wider pulse and the remaining pulse that is further from a position of a pulse corresponding to an effective contact portion in the final detection signal of a previous frame or a next frame.

12. The touch panel of claim 9, wherein
    the detection signal includes an X direction detection signal or a Y direction detection signal, and
    the X direction is substantially perpendicular to the Y direction.

13. The touch panel of claim 9, wherein
    the noise removing unit determines whether a width of the wider pulse and a width of a remaining pulse not included in the wider pulse are within an effective width range, and removes the wider pulse or the remaining pulse when the wider pulse or the remaining pulse h is not within the effective width range.

14. The touch panel of claim 13, wherein,
    when the width of the wider pulse and the width of the remaining pulse both are within the effective width range, the noise removing unit removes one of the wider pulse and the remaining pulse that is further from a position of a pulse corresponding to an effective contact portion in the final detection signal of a previous frame or a next frame.

15. The touch panel of claim 9, wherein
the detection signal includes an X direction detection signal or a Y direction detection signal, and
the X direction is substantially perpendicular to the Y direction.

16. The touch panel of claim 9, wherein
the detection signal and the final detection signal include a same remaining pulse.

\* \* \* \* \*